Feb. 7, 1967  G. B. BOOTH  3,303,452
PIEZORESISTIVE DEVICE
Filed May 12, 1964  4 Sheets-Sheet 1

INVENTOR
GALT B. BOOTH
BY
Byerly, Townsend, Watson & Churchill
ATTORNEYS.

INVENTOR
GALT B. BOOTH
BY
Byerly, Townsend, Watson & Churchill
ATTORNEYS.

United States Patent Office 3,303,452
Patented Feb. 7, 1967

3,303,452
PIEZORESISTIVE DEVICE
Galt B. Booth, Short Beach, Conn., assignor to Textron Electronics, Inc., Providence, R.I., a corporation of Delaware
Filed May 12, 1964, Ser. No. 366,816
11 Claims. (Cl. 338—5)

The present invention relates to piezoresistive devices and more particularly to electromechanical transducers employing the piezoresistive effect.

The discovery of the piezoresistive effect in semiconductor materials such as silicon and germanium has given rise to a wave of activity to put such effect to practical use. Many technical articles have appeared on the subject and numerous attempts have been made to provide practical transducers making use of this phenomenon. A thorough discussion of the theory involved may be found in an article entitled, "Semiconductor Strain Transducers," by F. T. Geyling and J. J. Forst in The Bell System Technical Journal, May 1960, pages 705 to 731.

The piezoresistive effect is that phenomenon which gives rise to a change in resistivity in a crystalline body when the body is subjected to mechanical stress. By affixing appropriate electrical connections to a piezoresistive body the variation in resistivity with changes in stress can be detected and utilized. The output impedance of a piezoresistive element is comparatively low enabling the use of low impedance detecting equipment and eliminating numerous problems found with the high impedance piezoelectric transducer.

One problem in adapting the piezoresistive element for transducer operation arises out of the fact that such elements vary their resistivity between any two points in response to applied stresses in all directions. But, a typical application in an accelerometer requires that the device respond to forces or stresses in the direction of interest to the exclusion of all others.

An object of the present invention is to provide a sensitive and light weight piezoresistive accelerometer whose output is substantially free from unwanted signals, particularly of the type just mentioned. It is a further object of the present invention to provide a piezoresistive device which is more sensitive than any known heretofore. A still further object is to provide an electromechanical transducer responsive to pressure or other parameters which makes use of the piezoresistive effect.

A pure monocrystal of silicon or germanium has an extremely high resistivity as compared to the resistivity of a good conductor such as copper or aluminum, although it is not quite an insulator. By proper doping with impurities the resistivity of the doped semiconductor material is reduced as a function of the amount of doping material present. Techniques are known for restricting the diffusion of impurities to desired boundaries or zones within a larger semiconductor body. In this way a region of substantially lower resistivity, although still high relative to the resistivity of a conductor, can be produced as an island in a larger body or substrate of higher resistivity material. If a voltage is applied through conductors making ohmic or near ohmic connection to spaced points in the doped region a current will be caused to flow which is essentially a function of the resistivity in the doped region. It is assumed that leakage current through the substrate is small enough to be ignored.

It is possible to suppress substantially all of the leakage current by diffusing impurities through the main body of opposite type to that diffused through the localized zone. In this manner a barrier junction is established between the zone and the main body.

The present invention is applicable to piezoresistive elements formed in either of the ways described above. The choice of method will depend upon the contemplated environment of the transducer. For high temperature operation it may be preferable to use an intrinsic or undoped main body or substrate. For low temperature or wide temperature range operation, the junction type may prove more stable with the appropriate biasing voltage applied across the junction.

In accordance with the present invention a piezoresistive device is provided in which a continuous zone of piezoresistive material is located in a beam member which is mounted for double cantilever deflection so as to have a longitudinal neutral axis and a centrally located inflection point, the zone being located substantially entirely within a region bounded by the inflection point, the neutral axis, a surface of the beam and an end of the beam, and a pair of conductive elements make ohmic connection to spaced apart points in said zone.

As used throughout this specification the expression "ohmic connection" is intended to include the type of connection that is achieved through the technique of vapor depositing an aluminum or other metallic layer on a semiconductor body such as silicon.

The invention will be better understood after reading the following detailed description of several presently preferred embodiments thereof with reference to the appended drawings in which:

FIGURE 13 is a sectional view similar to FIGURE 6 showing a modification of the transducer so as to respond to variations in pressure from an external medium.

Reference should now be had to the drawings wherein the same reference numerals are used throughout to designate the same parts.

Figure 1:
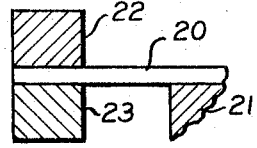
FIGURE 1 is a diagrammatic illustration of a beam mounted for double cantilever deflection.
Figure 2:
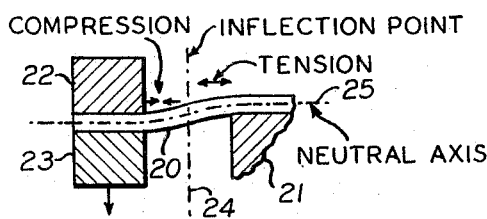
FIGURE 2 is an illustration of the beam of FIGURE 1 when deflected in one direction with appended legends for defining terminology.

In FIGURE 1 there is shown a beam 20 anchored at one end to a standard or rigid support 21. The opposite end of the beam is engaged by two rigid members 22 and 23. Let it be assumed that the members 22 and 23 are free to move up and down with the end of the beam but are constrained against any rotational movement. Thus, if the members 22 and 23 should be urged downward as viewed in the drawing relative to the standard 21 such movement will cause the beam 20 to deflect as shown in FIGURE 2. This is known as double cantilever deflection.

It will be observed from FIGURE 2 that the upper surface of the beam to the left of the line 24 is subject to compression while the same surface to the right of line 24 is placed under tension. The line 24 is at the inflection point and marks that point along the beam where the direction of curvature reverses.

A moment of reflection will reveal that the reverse conditions exist along the lower surface of the beam. That is, the lower surface is under tension to the left of line 24 and under compression to the right. The line of demarcation 25 along the length of the beam between the portions under compression and tension, respectively, is called the neutral axis.

Figure 3:
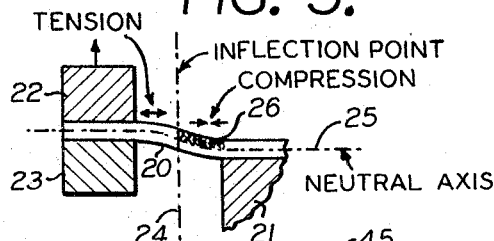
FIGURE 3 is an illustration similar to FIGURE 2, but showing the beam deflected in the opposite direction.

If the movable end of the beam is displaced upwardly the conditions shown in FIGURE 3 will prevail. The inflection point and neutral axis remain the same as in FIGURE 2 but the stresses on either side of the inflection point have been reversed. That portion which was under compression is now under tension and vice versa.

By way of further explanation, the entire shaded area 26 in FIGURE 3 is under compression. This area is bounded by the neutral axis 25, the inflection point 24, a surface of the beam (the upper surface), and an end of the beam. It will be understood that there are four such regions in each double cantilever beam.

Figure 4:
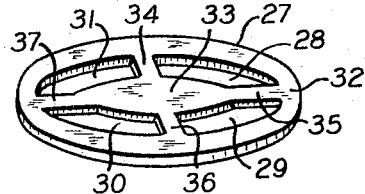
FIGURE 4 is a perspective view of a wafer of semiconductor material as employed in the various embodiments of the invention described herein.

Referring now to FIGURE 4 there is shown a thin disc or flat wafer of semiconductor material 27. A series of arcuate "windows" or annular apertures 28, 29, 30 and 31 have been formed in the disc 27 leaving a peripheral zone or radially outer portion 32 joined to a circular central portion or zone 33 by four orthogonally related radial arms or beams 34, 35, 36 and 37 lying in an intermediate zone.

Figure 5:
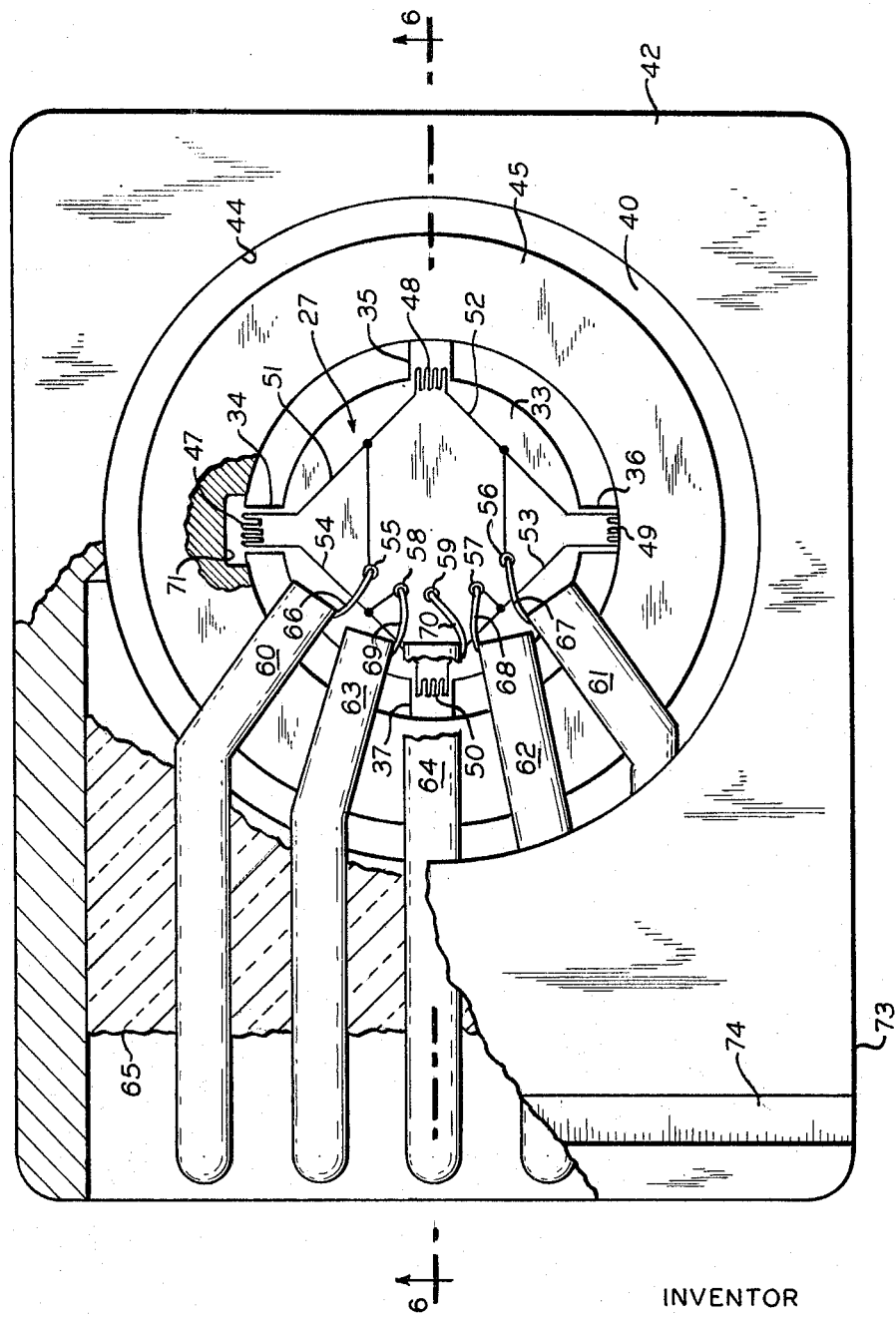
FIGURE 5 is a top plan view of an accelerometer constructed in accordance with the invention, with the top of the enclosure removed and portions broken away.
Figure 6:
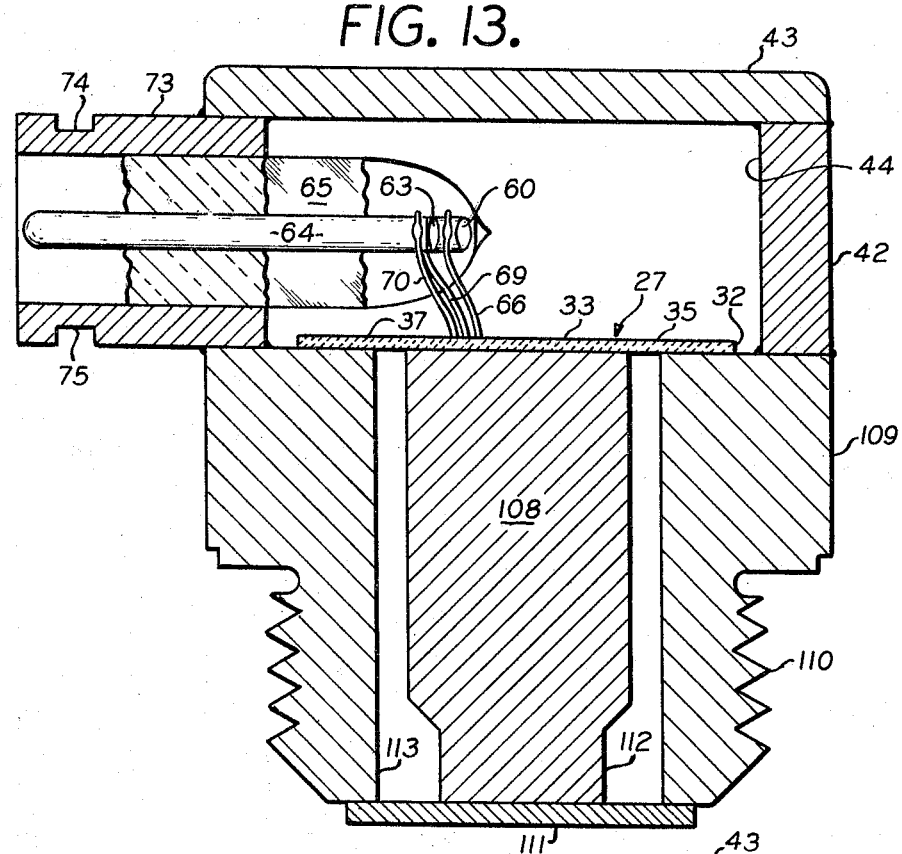
FIGURE 6 is a sectional view taken along line 6—6 in FIGURE 5.

The disc 27 of FIGURE 4, with appropriate piezoresistive zones prepared as will be described at a later point herein, can be incorporated in an accelerometer as shown in FIGURES 5 and 6 to which attention is now directed.

The disc is centered over a circular pedestal or standard 38 which is congruent with its central portion 33 and is secured thereto by suitable bonding means. The standard 38 is located in the center of a rectangular base 39 and is separated from the outer wall portions by an annular channel 40. A threaded mounting stud 41 extends from the bottom of the base 39 below the standard 38 and coaxial therewith.

An intermediate section 42 is brazed or otherwise joined to the base 39 to provide, along with a rectangular cover plate 43, a housing for the working parts of the accelerometer. The cover plate is brazed to the section 42 as a final assembly step to hermetically seal the entire device. As shown, the section 42 has a cylindrical bore 44 for accommodating the components to be described. The diameter of bore 44 may be the same as the major diameter of channel 40 in the base 39, as shown.

A pair of rigid solid rings 45 and 46 are bonded to opposite sides of the peripheral zone 32 of the wafer 27. The rings 45 and 46 are dimensioned to be congruent with zone 32. With the beams 34, 35, 36 and 37 of the wafer 27 located as shown, it should be evident that they are arranged for simultaneous double cantilever deflection in response to movement of rings 45 and 46 along an axis coinciding with the axis of the standard 38.

Sinuous zones of piezoresistive material 47, 48, 49 and 50 are located in beams 34, 35, 36 and 37, respectively. It should be noted that the zones 48 and 50 in diametrically opposite beams 35 and 37 are located on the radially inner side, and the other pair of zones, 47 and 49, are located on the radially outer side, of the respective inflection points.

As best seen in FIGURE 5, the piezoresistive zones 47, 48, 49 and 50 are interconnected by conductive elements or material 51, 52, 53 and 54 to form an electrical bridge circuit. Terminals 55, 56, 57 and 58 are joined by similar conductive connections to the respective corners of the bridge circuit. A fifth terminal 59, for a reason to be described, makes ohmic connection with the wafer body.

Metal pins 60, 61, 62, 63 and 64 are mounted through a glass seal 65 in a lateral opening in housing section 42. Gold or other suitable leads 66, 67, 68, 69 and 70 are spot welded to the inner ends of respective pins and joined to the respective terminals 55, 56, 57, 58 and 59 by suitable compression bonding techniques or the like.

Figure 8:
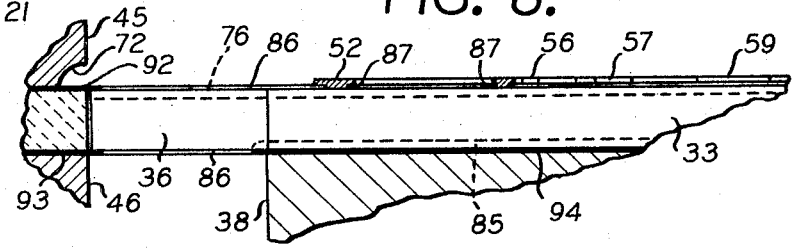
FIGURE 8 is a sectional view taken along line 8—8 in FIGURE 7.

The ring 45 is provided with cavities 71 and 72 (the latter is shown in FIGURE 8) to afford clearance for the piezoresistive zones 47 and 49. Section 42 of the housing extends beyond the base 39 at 73 to provide a receptacle for a plug (not shown) which can make electrical contact with the pins 60 to 64. Grooves 74 and 75 in the extension 73 are intended as a means for locking the plug to the receptacle.

Figure 9:
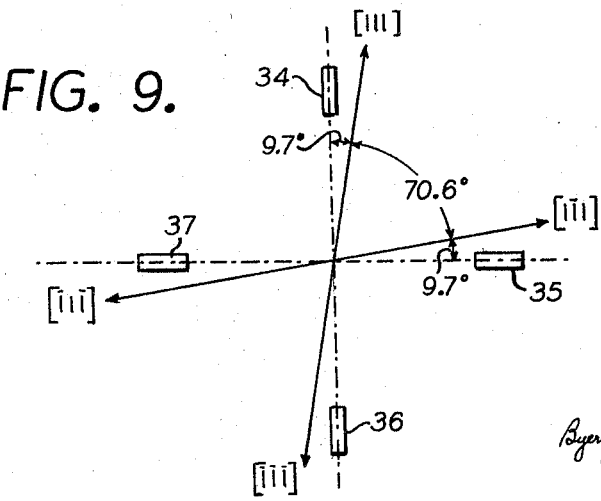
FIGURE 9 is a diagram illustrating the preferred orientation of p-type piezoresistive zones in an n-type substrate of silicon relative to the axes of maximum piezoresistive effect.
Figure 7:
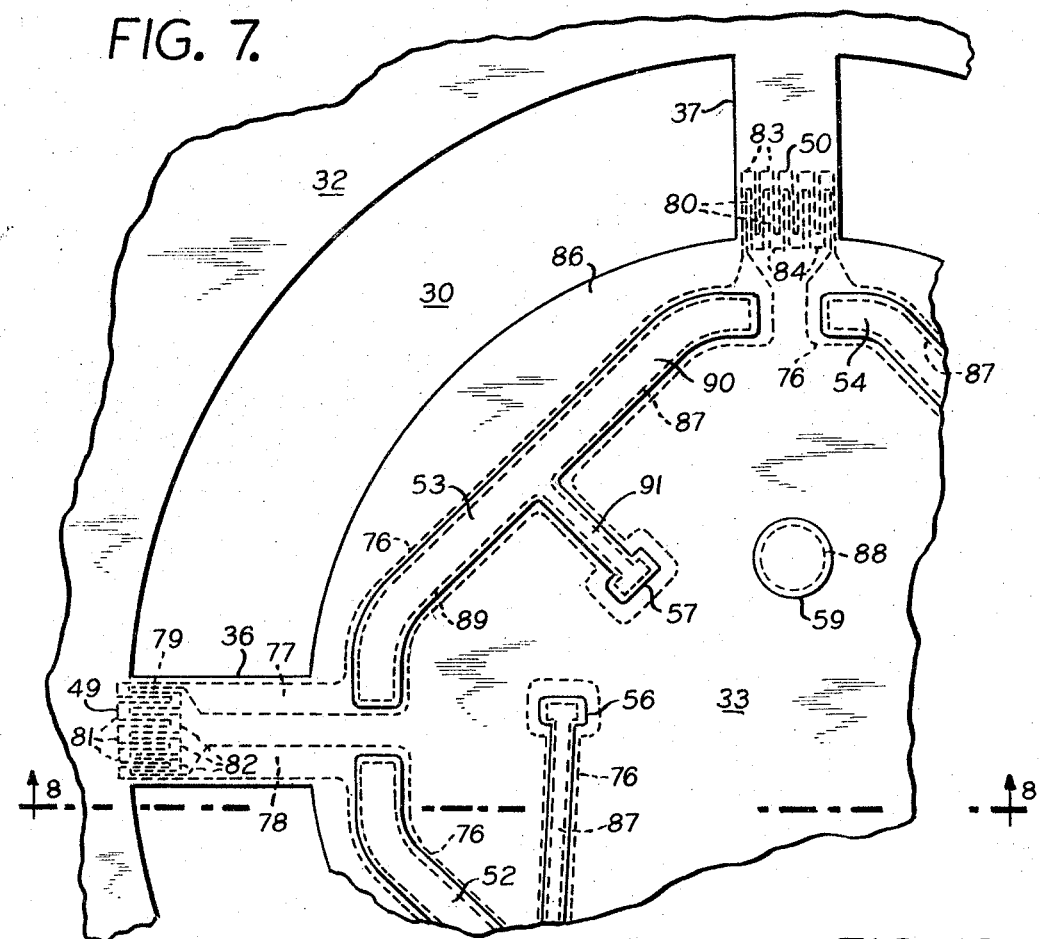
FIGURE 7 is an enlarged fragmentary plan view of a portion of the semiconductor wafer used in the embodiment of FIGURE 5 and showing the patterns for doping and applying conductive connections.

Further details of construction of the wafer element of the accelerometer of FIGURE 5 will now be given with reference to FIGURES 7, 8 and 9 to which attention is now directed.

A blank suitable for producing one or more of the wafers 27 is cut along the [110] plane from a single crystal of high purity n-type silicon. The blank is lapped to remove all saw scratches and major surface imperfections. It is then etched and treated in known manner to provide an ultra smooth surface free from all surface blemishes. The surface of the treated blank is then oxidized to prevent contamination.

By means of known masking techniques employing photo resist compositions, etching to remove the oxide layer in the desired areas, and subsequent exposure to an atmosphere of acceptor type impurity material, the four serpentine or sinuous zones (49 and 50 being shown in FIGURE 7) of p-type piezoresistive material are formed in the n-type substrate near one surface. Additional zones of p-type material are simultaneously formed within the broken line area 76 joining each of the sinuous zones to form a closed loop electrical bridge network. It should be noted that the p-type zones outside of the sinuous regions are made very wide, particularly in those areas, such as 77 and 78, which lie on a beam. The width of regions such as 77 and 78 should be many times the width of the narrow longitudinal sections, e.g., 79 and 80, of the sinuous zones. The turn-around regions, such as 81, 82, 83 and 84, in the sinuous zones should also be made wide relative to the longitudinal sections 79 and 80.

At the same time as the bridge circuit is formed on one side of the wafer, a surface zone encompassing the entire area which is to serve as the central portion 33 of the wafer is infused with p-type impurities as best seen in FIGURE 8. See the region 85. This provides a p-n barrier junction between the standard 38 and the main body portion of the wafer 27.

By a subsequent masking and etching procedure in known fashion "windows" in the protective oxide layer 86 are formed within the broken line regions such as 87 and 88. In the case of region 87 it lies wholly within the confines of the p-type zone so as to be isolated completely from the n-type substrate by a barrier junction. Aluminum or other suitable conductive material is then deposited over the "windows" so as to make ohmic contact with the semi-conductor material below. It will be understood that the conductive material 59 makes contact with the n-type substrate while the conductive material at 52, 53 or 54, for example, contacts p-type material.

Considering the connecting link 53, for example, its separate arms 89 and 90 on opposite sides of the common leg 91 should be equal or nearly equal in electrical characteristics so as to balance or cancel out any error that might be introduced through imperfect ohmic connection to the underlying piezoresistive material. The same is true of the connections 51, 52 and 54.

By similar masking techniques a gold or other suitable metal or alloy layer is applied at 92, 93 and 94 (see FIGURE 8) for providing suitable bonding surfaces for securing the wafer to rings 45 and 46 and to standard 38. Bonding may be achieved by a known eutectic or the like.

Generally, the original blank cut from the silicon crystal will be large enough to lay out patterns for several round wafers, side by side. After the preceding steps are completed, the blank is suitably masked and etched to separate the individual wafers and to cut the annular windows such as 28 to 31 in FIGURE 4. The edges are then polished and oxidized to complete the element.

It was stated above that the wafer was cut along a [110] plane from the crystal. Such a cut will contain the [111] axes of the crystal which intersect at an angle of approximately 70.6° as shown by the solid line arrows in FIGURE 9. It is known that for p-type silicon the maximum piezoresistive effect lies along the [111] axes. Hence, for optimum sensitivity the beams 34 to 37 should be oriented in the wafer 27 with respect to the [111] axes as shown in FIGURE 9. That is, the axis of each beam should lie approximately 9.7° from a [111] crystal axis.

Figure 10:
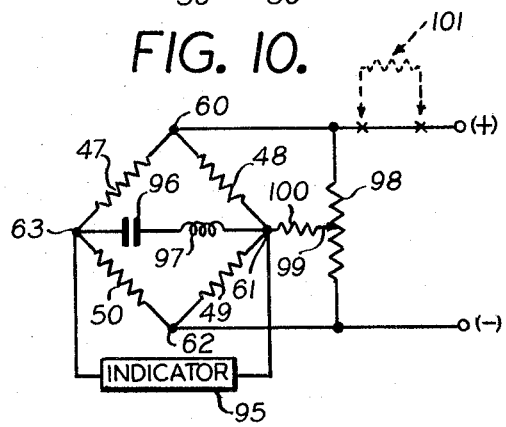
FIGURE 10 is a simplified schematic diagram of an electric circuit for utilizing the transducer of FIGURE 5.

FIGURE 10 shows schematically the operating circuit when the accelerometer is in use. As an example, pin 60 can be connected to the positive terminal of a source of direct current while pin 62 is connected to the negative terminal. Pins 61 and 63 are connected to a suitable indicator 95. Connected in parallel with the indicator is a filter network composed of a capacitor 96 and an inductance 97. This filter may have a resonant frequency of 15 kilocycles and functions to suppress peaking due to mechanical resonances in the system. It is assumed that the resonance point of the rings 45 and 46 and the supporting beams is about 15 kilocycles also. Of course, the filter should be matched to the mechanical resonance of the device.

For the purpose of zero adjusting the system there is provided a potentiometer 98 shunting the source of supply voltage with its slider 99 connected through a resistor 100 to pin 61 of the accelerometer.

Not shown in FIGURE 10 is the connection between pin 64 of the accelerometer and a source of biasing voltage. The polarity of the biasing voltage will depend upon the type of service contemplated for the device. A back bias (positive on pin 64, negative on housing 39) is preferred for low temperature operation. A forward bias is preferred where a wide temperature range is to be encountered. However, if the device is intended to be used at elevated temperatures, it may be found preferable to replace the n-type silicon substrate with intrinsic silicon. Where the n-type is used, however, the doping should be relatively light.

In order to obtain an understanding of the operation of the accelerometer and still referring to FIGURE 10 let it be assumed that the resistances of resistors 47, 48, 49 and 50 are all equal when the device is quiescent. Assume, further, a change in resistor 47. If this change is matched by a change of like magnitude and direction in resistor 48 or resistor 50, or of like magnitude but opposite direction in resistor 49, the output from the bridge to the indicator will remain unchanged. A similar relationship exists for each of the other resistive arms of the bridge. It will be shown that for all movement of the moving element of the accelerometer other than along the axis of interest signal cancellation will occur by the mechanism just described. However, for movement along the axis of interest, diametrically opposite arms of the bridge will tend to change in the same direction while orthogonally related or adjacent arms will tend to change in opposite directions to provide a sensitive and "magnified" output.

Motion of the rings 45 and 46 relative to the standard 38 at any one instant can be defined in terms of translational and rotational motion both in the horizontal and vertical directions as viewed in FIGURE 6. Horizontal translation can be resolved into longitudinal stresses in tension or compression on the various beams 34 to 37 and/or shear stresses. With reference to FIGURE 5, for the simple case of horizontal movement of standard 38 toward the right relative to the rings 45 and 46 (in the plane of the paper) beam 35 will be subjected to compression, beam 37 will be stressed in tension while beams 34 and 36 will be subjected to shearing stresses. Assuming the magnitudes of the stresses on beams 35 and 37 to be the same, the resistors 48 and 50 will vary in opposite directions maintaining the bridge balance. It will also be understood by those skilled in the art that the shear stresses on beams 34 and 36 will cause resistors 47 and 49 to vary in opposite directions also. Hence, there is no bridge output from this effect.

Next, consider relative motion in the form of rotation in the plane of the paper in FIGURE 6. This will tend to cause simple cantilever deflection of beams 35 and 37, except while one bends down the other will bend up. Again, resistors 48 and 50 will change in opposite directions and neutralize each other. It will also be understood that the torsion applied to beams 34 and 36 will cause essentially zero change in the resistance of resistors 47 and 49. This can be understood when it is appreciated that torsion will tend to apply equal and opposite stresses to each half of a given resistor.

The foregoing explanation can be expanded to demonstrate how the effect of all parasitic or undesirable motion cancels out before reaching the indicator 95. Now, consider motion directed along the axis of the standard 38. All of the beams 34 to 37 will be deflected in the same direction and in the same manner. Hence, radially inner resistors 48 and 50 will vary equally in one direction while resistors 47 and 49 will vary to the same extent in the opposite direction. This results in maximum bridge output since the effects of the resistance changes are additive.

Piezoresistive elements of the type discussed herein tend to be thermal sensitive. Hence, it may be found necessary to provide a degree of compensation in the form of insertion of a resistor 101 between the points marked by the x's in FIGURE 10. The value of resistor 101 can be chosen as described in the publication referred to previously.

Figure 11:
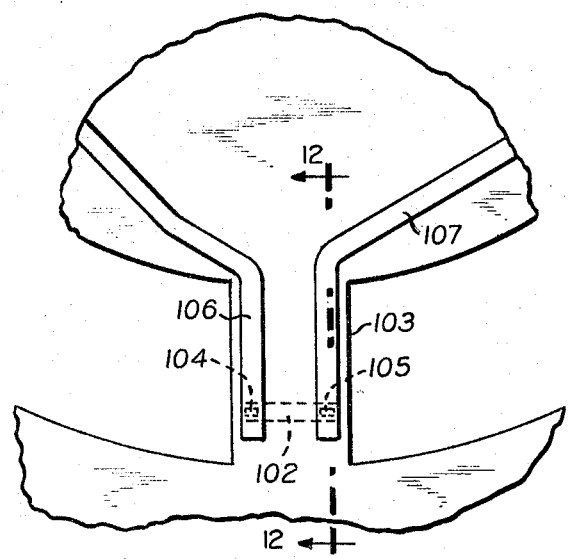
FIGURE 11 is an enlarged fragmentary plan view showing a modification of the invention.
Figure 12:
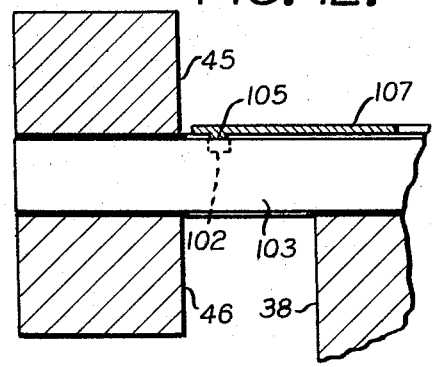
FIGURE 12 is a section taken along line 12—12 in FIGURE 11.

The accelerometer described above makes use of the axial piezoresistive effect, that is, change in resistance in the same direction as the direction of applied stress. However, it is also possible to take advantage of the transverse piezoresistive effect wherein the resistance change is at right angles to the direction of applied stress. A modification making use of the transverse effect is shown in FIGURES 11 and 12.

The construction of the wafer of semiconductor material is the same as in FIGURE 4. However, the piezoresistive element, instead of being sinuous, is in the form of a rectangle, e.g., 102, normal to the longitudinal axis of the beam 103. Windows 104 and 105 enable ohmic contact to be made to element 102 by conductive strips 106 and 107. Only one beam is shown in FIGURE 11, but it will be understood that each of the beams of FIGURES 5 to 8 will be similarly modified along with the connecting links of the bridge circuit. FIGURE 11 shows element 102 adjacent the peripheral zone of the wafer and it is to be understood that the orthogonally related piezoresistive elements will be adjacent the center zone of the wafer. The orientation of the beams relative to the piezoresistive axes of the crystal can be chosen in known manner for optimum output.

FIGURE 13 shows the invention as applied to a pressure transducer. Those parts bearing the same reference numerals as in FIGURE 6 may be identical. However, the circular pedestal or standard is replaced by a plunger 108, and the outer zone 32 of the wafer 27 is mounted on the hollow cylindrical member 109 which forms the base for the housing and is at the same time provided with a threaded end 110. A flexible diaphragm 111 bridges the annular gap between elements 108 and 109 and establishes an hermetic seal therebetween. The diaphragm may be attached by brazing or the like.

When the threaded end 110 of the housing is installed in the wall of a pressure vessel or fitting or the like, pressure acting on diaphragm 111 will tend to displace plunger 108 causing double cantilever deflection of the four beams in the semiconductor wafer. An output will be developed as a function of the travel of plunger 108 and, hence, as a function of the pressure. The sensitivity of the transducer can be controlled by proper choice of the thickness of diaphragm 111, the diameter of the end 112 of plunger 108, and the diameter of the mouth 113 of the bore in the base member 109. For example, for high sensitivity to low pressure levels the diaphragm should be made thin and the diameter of end 112 small relative to the diameter of 113.

The examples described so far have made use of p-type piezoresistive zones in an intrinsic or n-type substrate. Obviously, it is possible to reverse the semiconductor type so as to employ n-type piezoresistors. As is well known, a different crystal cut should be used so as to make use of those piezoresistive axes which provide the greatest piezoresistive coefficients.

In certain instances it may be found desirable to interpose a ceramic disc insulator between the central zone 33 of the wafer and the standard on which it is mounted.

It is to be understood that the housing in the various embodiments may be constructed of tungsten or a special alloy steel known as Kovar or other suitable material which has similar thermal expansion characteristics to those glass compositions which can be used for mounting the connector pins. It is contemplated that a typical embodiment of the accelerometer shown in FIGURES 5 and 6 will have a base measuring 0.250" by 0.250" in horizontal cross section and a height exclusive of the mounting stud 41 of 0.175". A typical wafer may have a diameter of 0.175" and a thickness of 0.003". The diameter of the central zone 33 may be 0.093" while the inner diameter of the peripheral zone 32 may be 0.115" with the beams having a width of 0.010".

The invention has been described with reference to certain presently preferred embodiments thereof. Various changes may occur to those skilled in the art without departing from the true spirit of the invention as defined in the appended claims.

What is claimed is:

1. A piezoresistive device comprising a flat wafer of semiconductor material having a circular central portion surrounded by a radially spaced concentric encircling outer portion joined to the central portion by four substantially orthogonally related radial arms, a first rigid body secured to said central portion of the wafer, a second rigid body secured to said outer portion of the wafer, said bodies being movable relative to each other and arranged upon relative movement in opposite directions parallel to a normal to the plane of said wafer for imparting simultaneous double cantilever deflection to said four arms, said arms each having for said deflection a longitudinal neutral axis and a centrally located inflection point, a continuous piezoresistive zone in each arm containing dispersed active impurities located substantially entirely within a region bounded by the respective inflection point, neutral axis, one of the faces of the wafer and one of the ends of the arm, said impurities being of a type producing a barrier junction between said zones and the adjacent material, the regions in two diametrically opposed arms being adjacent the central portion of the wafer while the regions in the other two arms are adjacent the outer portion, all of the regions lying adjacent the same face of the wafer, and conductive elements making ohmic connection to at least two spaced apart points in each of said zones.

2. A piezoresistive device according to claim 1, wherein said conductive elements comprise conductive material carried by said wafer and connecting the four piezoresistive zones into an electrical bridge circuit with said arms occupying positions in said bridge corresponding to their relative position in the wafer, and means for establishing electrical connection with the electrical corners of said bridge.

3. A piezoresistive device according to claim 2, wherein said piezoresistive zones each extend along a narrow straight line path across the width of the respective arm.

4. A piezoresistive device according to claim 2, wherein said piezoresistive zones each extend along a narrow serpentine path having a high ratio of longitudinal to transverse length relative to the longitudinal and transverse axes of the respective arm.

5. A piezoresistive device according to claim 2, wherein said first rigid body has a circular pedestal equal in diameter to the diameter of said central portion of the wafer, said central portion of the wafer is bonded coaxially to said pedestal, and said second rigid body includes an independent pair of solid rings coextensive with said outer portion of the wafer and bonded respectively to opposite faces thereof.

6. A piezoresistive device according to claim 2, wherein said first rigid body is in the form of a plunger having a circular end equal in diameter to the diameter of said central portion of the wafer, said central portion of the wafer is bonded coaxially to said end of the plunger, said second rigid body includes a hollow cylindrical member concentric with said plunger and having a face coextensive with said outer portion of the wafer and bonded thereto on the same side of the wafer as said plunger, and means for axially displacing said plunger with respect to said hollow cylindrical member for producing said double cantilever deflection.

7. A piezoresistive device according to claim 6, wherein the means for axially displacing the plunger comprises a pressure diaphragm sealing the space between the free end of the plunger and the hollow cylindrical member, and means for enabling a fluid force to be exerted against said diaphragm relative to said hollow cylindrical member.

8. A piezoresistive device comprising a unitary flat wafer of semiconductor material having a plurality of independent annular apertures therein defining a circular central portion surrounded by a radially spaced concentric encircling outer portion joined to the central portion by a plurality of radial arms, a first rigid body secured to said central portion of the wafer, a second rigid body secured to said outer portion of the wafer, said bodies being movable relative to each other and arranged upon relative movement in opposite directions parallel to a normal to the plane of said wafer for imparting simultaneous double cantilever deflection to said arms, piezoresistive zones located in said arms by reason of the presence of active impurities dispersed therein, and means for establishing electrical connection to spaced apart points in each of said zones.

9. A piezoresistive device comprising a unitary flat wafer of semiconductor material having a central zone and a peripheral zone joined by an intermediate zone of at least one pair of diametrically opposed radial arms, a first rigid body secured to said central zone of the wafer, a second rigid body secured to said pheripheral zone of the wafer, said bodies being movable relative to each other and arranged upon relative movement in opposite directions parallel to a normal to the plane of said wafer for imparting double cantilever deflection to said arms, piezoresistive regions formed in said pair of arms by dispersed active impurites of a type producing a barrier junction between said regions and the adjacent material, said regions being located in said arms on the same side of the wafer and on the same side of the respective inflection points of the arms relative to the central zone of the wafer so that for a given direction of cantilever deflection of said arms said regions will be subjected primarily to tensile forces and for the opposite direction of cantilever deflection said regions will be subjected primarily to compressive forces and conductive elements making ohmic connection to at least two spaced apart points in each of said regions.

10. A piezoresistive device comprising a flat wafer of semiconductor material having a central zone and a peripheral zone joined by an intermediate zone of at least one pair of diametrically opposed radial arms, a pedestal secured to and supporting said central zone of the wafer, a rigid annular member secured to said peripheral zone of the wafer, the wafer being the sole support for said annular member, said annular member upon movement relative to said pedestal in a direction parallel to a normal to the plane of said wafer imparting double cantilever deflection to said arms, piezoresistive regions formed in said pair of arms by dispersed active impurities of a type producing a barrier junction between said regions and the adjacent material, said regions being located in said arms on both the same side of the wafer and on the same side of the respective inflection points of the arms relative to the central zone of the wafer so that for a given direction of double cantilever deflection of said arms said regions will be subjected primarily to tensile forces and for the opposite direction of double cantilever deflection said regions will be subjected primarily to compressive forces, and conductive elements making ohmic connection to at least two spaced apart points in each of said regions.

11. A piezoresistive device comprising a flat wafer of semiconductor material having a central portion surrounded by a radially spaced encircling outer portion joined to the central portion by four substantially equal length orthogonally related radial arms, a first rigid body secured to said central portion of the wafer, a second rigid body secured to said outer portion of the wafer, said bodies being movable relative to each other and arranged upon relative movement in opposite directions parallel to a normal to the plane of said wafer for imparting simultaneous double cantilever deflection to said four arms, said arms each having for said deflection a longitudinal neutral axis and a centrally located inflection point, a continuous piezoresistive zone in at least two of said arms which are diametrically opposed, said zones containing dispersed active impurities located substantially entirely within a region bounded by the respective inflection point, neutral axis, one of the faces of the wafer and one of the ends of the arm, said impurities being of a type producing a barrier junction between said zones and the adjacent material, said regions being located in said two arms on the same side of the respective inflection points of the arms relative to the central portion of the wafer and adjacent the same face of the wafer, and conductive elements making ohmic connection to at least two spaced apart points in each of said zones.

References Cited by the Examiner

UNITED STATES PATENTS

| Re. 25,924 | 12/1965 | Stedman | 338—2 |
| 2,359,245 | 9/1944 | Ritzmann | 73—71.2 |
| 2,848,892 | 6/1958 | Hoffman. | |
| 2,889,527 | 6/1959 | Statham | 338—41 X |
| 2,963,911 | 12/1960 | Courtney-Pratt et al. | 73—88.5 X |
| 3,022,672 | 2/1962 | Dimeff et al. | 338—42 |
| 3,035,240 | 5/1962 | Starr | 338—4 |
| 3,049,685 | 8/1962 | Wright | 338—2 |
| 3,060,396 | 10/1962 | Gibbs et al. | 338—42 X |
| 3,139,598 | 6/1964 | Ruge | 338—4 |
| 3,161,061 | 12/1964 | Ames | 73—398 |
| 3,161,844 | 12/1964 | Kabell | 73—88.5 X |
| 3,168,718 | 2/1965 | Swartz et al. | 338—42 |

FOREIGN PATENTS 923,153    4/1963    Great Britain.

RICHARD M. WOOD, *Primary Examiner.*

W. D. BROOKS, *Assistant Examiner.*